United States Patent
Marzetta (10) Patent No.: US 9,130,618 B2
(45) Date of Patent: Sep. 8, 2015

(54) MIMO COMMUNICATION SYSTEM WITH VARIABLE SLOT STRUCTURE

(75) Inventor: Thomas Louis Marzetta, Summit, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 2091 days.

(21) Appl. No.: 11/553,191

(22) Filed: Oct. 26, 2006

(65) Prior Publication Data

US 2008/0101310 A1 May 1, 2008

(51) Int. Cl.
H04B 7/04 (2006.01)

(52) U.S. Cl.
CPC .................... *H04B 7/0452* (2013.01)

(58) Field of Classification Search
CPC ............ H04L 5/46; H04L 5/48; H04L 5/005; H04L 27/2613; H04L 27/2662
USPC .................................................. 370/336, 337
See application file for complete search history.

(56) References Cited

U.S. PATENT DOCUMENTS

| | | | |
|---|---|---|---|
| 6,058,105 A | 5/2000 | Hochwald et al. | |
| 6,307,882 B1 | 10/2001 | Marzetta | |
| 6,327,310 B1 | 12/2001 | Hochwald et al. | |
| 6,330,460 B1 | 12/2001 | Wong et al. | |
| 6,684,086 B2 | 1/2004 | Miya | |
| 6,757,272 B1 * | 6/2004 | Abeta et al. | 370/342 |
| 6,937,592 B1 * | 8/2005 | Heath et al. | 370/342 |
| 7,463,601 B2 * | 12/2008 | Lee et al. | 370/328 |
| 2004/0081131 A1 * | 4/2004 | Walton et al. | 370/344 |
| 2004/0082311 A1 | 4/2004 | Shiu et al. | |
| 2004/0087275 A1 * | 5/2004 | Sugar et al. | 455/61 |
| 2004/0131025 A1 * | 7/2004 | Dohler et al. | 370/328 |
| 2004/0162083 A1 * | 8/2004 | Chen et al. | 455/454 |
| 2004/0192216 A1 | 9/2004 | Marzetta et al. | |
| 2005/0226173 A1 * | 10/2005 | Strawczynski et al. | 370/278 |
| 2005/0265290 A1 | 12/2005 | Hochwald et al. | |
| 2006/0098754 A1 * | 5/2006 | Kim et al. | 375/267 |
| 2006/0146867 A1 | 7/2006 | Lee et al. | |

(Continued)

FOREIGN PATENT DOCUMENTS

EP  1 063 780 A2 * 12/2000 ............ H04B 1/707
JP  2001169326 A  6/2001

(Continued)

OTHER PUBLICATIONS

Goldsmith, Andrea; Wireless Communications, 2005, pp. 463-464.*

(Continued)

*Primary Examiner* — Rafael Pérez-Gutiérrez
*Assistant Examiner* — Joshua Schwartz
(74) *Attorney, Agent, or Firm* — Ryan, Mason & Lewis, LLP (57) ABSTRACT

A multiple-input, multiple-output (MIMO) communication system is configured to utilize a variable slot structure. The system includes multiple terminals and at least one base station configured to communicate with the terminals. The base station is operative to determine mobilities for respective ones of the terminals, to arrange the terminals into groups based on the determined mobilities, and to utilize at least first and second different slot structures for communicating with the terminals of at least respective first and second ones of the groups. The system may be, for example, a multi-user MIMO system in which the multiple terminals comprise autonomous single-antenna terminals.

21 Claims, 9 Drawing Sheets

(56) References Cited

U.S. PATENT DOCUMENTS

| | | | |
|---|---|---|---|
| 2007/0155387 A1* | 7/2007 | Li et al. | 455/441 |
| 2007/0177494 A1 | 8/2007 | Tomizawa | |

FOREIGN PATENT DOCUMENTS

| | | | | |
|---|---|---|---|---|
| JP | 2003259430 A | 9/2003 | | |
| JP | 2006270339 A | 10/2006 | | |
| KR | 1020050072772 A | 7/2005 | | |
| WO | WO 99/59269 A1 * | 11/1999 | | H04B 7/26 |
| WO | 2004/040800 A1 | 5/2004 | | |
| WO | 2004056022 A2 | 7/2004 | | |
| WO | 2006077842 A1 | 7/2006 | | |
| WO | 2006082637 A1 | 8/2006 | | |
| WO | PCT/US2007/022395 | 3/2008 | | |

OTHER PUBLICATIONS

Viterbi, Andrew; CDMA Principles of Spread Spectrum Communication, 1995, p. 199.*

Caire et al., "On the Achievable Throughput of a Multiantenna Gaussian Broadcast Channel," IEEE Transactions on Information Theory, Jul. 2003, pp. 1691-1706, vol. 49, No. 7.

Hassibi et al., "How Much Training is Needed in Multiple-Antenna Wireless Links?" IEEE Transactions on Information Theory, Apr. 2003, pp. 951-963, vol. 49, No. 4.

Thomas L. Marzetta, "BLAST Training: Estimating Channel Characteristics for High Capacity Space-Time Wireless," Proceedings 37th Annual Allerton Conference on Communication, Control, and Computing, Sep. 22-24, 1999, 9 pages, Monticello, IL.

Muriel Medard, "The Effect Upon Channel Capacity in Wireless Communications of Perfect and Imperfect Knowledge of the Channel," IEEE Transactions on Information Theory, May 2000, pp. 933-946, vol. 46, No. 3.

Vishwanath et al., "Duality, Achievable Rates, and Sum-Rate Capacity of Gaussian MIMO Broadcast Channels," IEEE Transactions on Information Theory, Oct. 2003, pp. 2658-2668, vol. 49, No. 10.

Viswanath et al., "Sum Capacity of the Vector Gaussian Broadcast Channel and Uplink-Downlink Duality," IEEE Transactions on Information Theory, Aug. 2003, pp. 1912-1921, vol. 49, No. 8.

* cited by examiner

M TRANSMIT ANTENNAS TO K SINGLE-ANTENNA TERMINALS:
K REVERSE-PILOTS

FIG. 7

M TRANSMIT ANTENNAS TO K SINGLE-ANTENNA TERMINALS:
K REVERSE-PILOTS

FIG. 17

MIMO COMMUNICATION SYSTEM WITH VARIABLE SLOT STRUCTURE

FIELD OF THE INVENTION

The present invention relates generally to communication systems, and more particularly to multiple-input, multiple-output (MIMO) communication systems.

BACKGROUND OF THE INVENTION

MIMO communication systems come in a variety of different types, including, for example, point-to-point systems and multi-user systems. In a typical point-to-point MIMO communication system, a multi-antenna array in one terminal transmits to a multi-antenna array in another terminal, thereby achieving throughput gains relative to a single-antenna link having similar power and spectral bandwidth. In a typical multi-user MIMO communication system, a multi-antenna array in a base station sends multiple data streams selectively and simultaneously to autonomous single-antenna terminals, again achieving throughput gains relative to a set of single-antenna links. Multi-user systems of this type are sometimes referred to as "broadcast" MIMO systems. The converse to broadcast MIMO is sometimes referred to as "multi-access" MIMO, and it entails the autonomous single-antenna terminals sending multiple data streams simultaneously to the multi-antenna array in the base station.

Multi-user MIMO has a number of advantages relative to point-to-point MIMO. For example, terminals in multi-user MIMO systems can be simple and inexpensive. Also, point-to-point MIMO can fail to deliver the desired high throughput in line-of-sight propagation conditions, while under the same conditions multi-user MIMO continues to provide high throughput as long as the angular separation of the terminals exceeds the Rayleigh resolution of the transmit array. Furthermore, multi-user MIMO seamlessly handles the transition between line-of-sight and rich-scattering propagation.

The principle drawback of multi-user MIMO is that the base station has to know the propagation characteristics of the forward channel. The process through which the base station obtains this information is generally referred to as training. See, for example, U.S. Patent Application Publication No. 2005/0265290 to Hochwald et al. entitled "Feedback Method For Channel State Information of a Wireless Link," which is commonly assigned herewith and incorporated by reference herein.

It is recognized that the acquisition of such forward channel information is facilitated by time-division duplex (TDD) operation. In the TDD context, the principle of reciprocity implies that the reverse channel matrix is equal to the transpose of the forward channel matrix, so the base station can readily obtain the required forward channel information by processing pilot signals transmitted by the terminals on the reverse link.

Unfortunately, conventional approaches to multi-user MIMO communication may not be optimally configured for high terminal mobility situations. For example, under propagation conditions associated with high mobility, conventional approaches may not allow enough time before the channel changes to transmit reverse pilots and then transmit the forward data streams. Also, under low signal to interference-plus-noise ratio (SINR) conditions, an excessive number of pilot symbols may be required to obtain a channel estimate of sufficiently good quality to enable selective transmission of the data streams. Thus, systems based on these conventional approaches may be unable to obtain the full throughput advantages of multi-user MIMO communication.

A need therefore exists for improved approaches to multi-user MIMO communication, particularly in terms of providing improved system throughput in the presence of high terminal mobility.

SUMMARY OF THE INVENTION

The present invention in an illustrative embodiment provides improved throughput in a MIMO system through the use of a variable slot structure.

In accordance with an aspect of the invention, a MIMO system is configured to utilize a variable slot structure. The system includes multiple terminals and at least one base station configured to communicate with the terminals. The base station is operative to determine mobilities for respective ones of the terminals, to arrange the terminals into groups based on the determined mobilities, and to utilize at least first and second different slot structures for communicating with the terminals of at least respective first and second ones of the groups. A priority may be established for serving the groups, and the groups are then served by the base station in accordance with the established priority.

The mobilities of the respective terminals may be determined, for example, based on channel measurements or satellite-based measurements. The terminal mobilities may be specified as respective velocity indicators, or using other types of information indicative of terminal mobility.

If a given one of the groups includes more terminals than can be served in a single slot, the given group may be separated into two or more smaller groups based on relative angular positions of the terminals in the given group.

The system in the illustrative embodiment is a multi-user MIMO system in which the multiple terminals comprise autonomous single-antenna terminals. More specifically, in the multi-user MIMO system of the illustrative embodiment, the base station communicates with the multiple terminals via an antenna array comprising M antennas and the multiple terminals comprise K single-antenna terminals, where M≥K. In other embodiments, one or more of the terminals may each comprise multiple antennas.

Optimal slot structures may be determined for communicating with the terminals of respective ones of the groups. A given such slot structure may be specified by a slot length, a number of terminals to be served in the slot over a forward link and a number of reverse link pilots. Preferably, the slot length of the given slot structure is less than or equal to an interval of time over which the terminals of that group move some specified fraction of a wavelength at the communication frequency. Such an interval of time is also referred to herein as a coherence interval, and may have a duration specified as a particular number of communication symbols within the system.

By way of example, the coherence interval may be specified as having a duration of T symbols, with a first portion comprising $\tau_{rp}$ reverse pilot symbols transmitted by the terminals of the corresponding group to the base station, a second portion comprising a training computation interval with a duration of a single symbol, and a third portion comprising $(T-1-\tau_{rp})$ forward symbols which are transmitted by the base station to respective ones of the terminals of the corresponding group.

An optimal slot structure for communicating with the terminals of a given one of the groups may be identified by simultaneously determining a number of terminals to serve in a slot and a number of reverse link pilots for the slot, based on maximization of a throughput measure given a specified number of base station antennas. The throughput measure may comprise, for example, a lower bound on a sum-capacity of the system.

Advantageously, the variable slot structure of the illustrative embodiment provides significantly improved throughput in a multi-user MIMO communication system, compared to a system utilizing a fixed slot structure. For example, even in short coherence intervals and with low SINRs, a base station comprising sixteen or more antennas can both learn the channel and transmit, with high aggregate throughput, simultaneous multiple data streams to multiple single-antenna terminals. Higher or lower numbers of base station antennas may be used in other embodiments.

These and other features and advantages of the present invention will become more apparent from the accompanying drawings and the following detailed description.

DETAILED DESCRIPTION OF THE INVENTION

The present invention will be illustrated below in conjunction with exemplary multi-user MIMO systems and associated variable slot structures. It should be understood, however, that the invention is not limited to use with any particular type of MIMO system or variable slot structures. The disclosed techniques are suitable for use with a wide variety of other MIMO systems and variable slot structures, and in numerous alternative applications. For example, aspects of the present invention may be implemented in cellular communication systems, as well as in wireless networks such as Wi-Fi or WiMax.

The term "base station" as used herein is therefore intended to be construed broadly so as to encompass, by way of example, a cellular system base station, or an access point of a wireless network.

Figure 1:
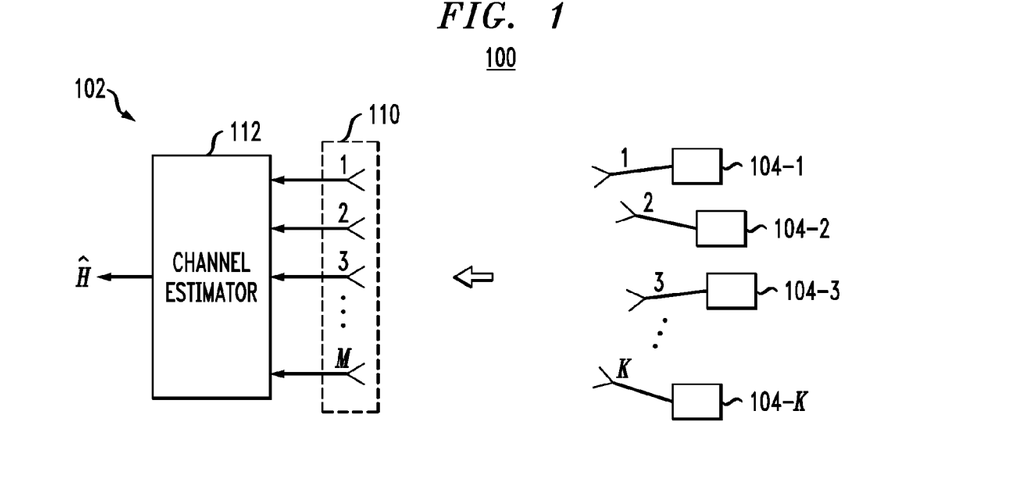
FIG. 1 is a simplified diagram of a multi-user MIMO communication system in an illustrative embodiment of the invention, more particularly showing transmission from the terminals to the base station on a reverse link.

FIG. 1 shows a multi-user MIMO system 100 comprising a base station 102 which communicates with a plurality of terminals more particularly denoted as 104-1, 104-2, . . . 104-K each equipped with a single antenna denoted 1, 2, 3, . . . K. The terminals may be, for example, mobile telephones, portable computers, wireless email devices, personal digital assistants (PDAs) or other user communication devices, in any combination. The base station 102 includes an antenna array 10 comprising M antennas as shown. In this illustrative embodiment, it is assumed that the terminals 104 transmit orthogonal pilot sequences to the base station 102 on the reverse link. Further, TDD operation is assumed, such that through TDD reciprocity a channel estimator 112 in the base station generates an estimate $\hat{H}$ of the forward channel propagation characteristics, also referred to herein as the forward channel matrix.

In other embodiments, one or more of the terminals 104 may each comprise multiple antennas, rather than a single antenna as in the present illustrative embodiment. Those skilled in the art will appreciate that the techniques disclosed herein can be adapted in a straightforward manner for use with one or more such multi-antenna terminals.

Also, as indicated above, the disclosed techniques can be adapted for use in MIMO systems in which the above-noted reciprocity does not apply, such as frequency-division duplex (FDD) systems.

Figure 2:
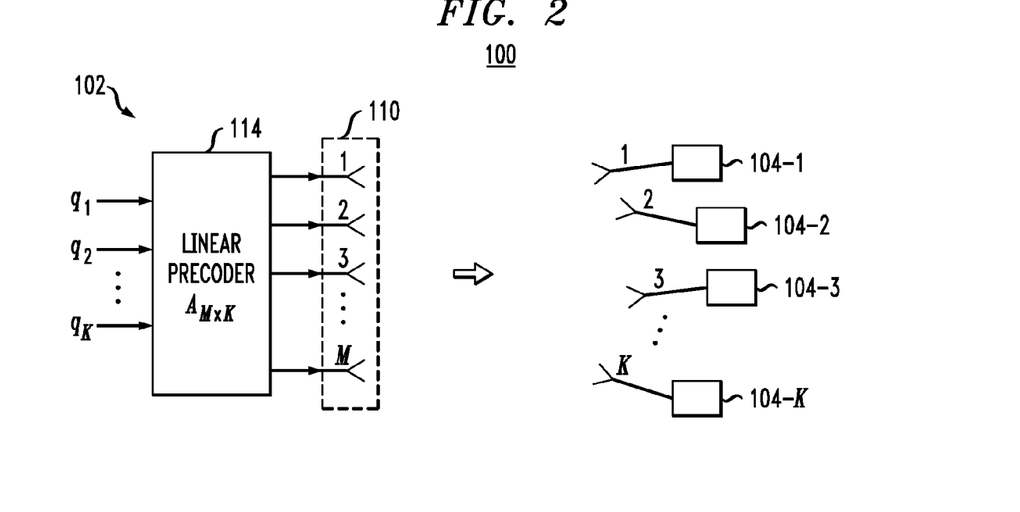
FIG. 2 is another view of the multi-user MIMO communication system of FIG. 1 more particularly showing transmission from the base station to the terminals on a forward link.

FIG. 2 illustrates the forward link of the multi-user MIMO system 100. In this view, the base station 102 transmits sequences of quadrature amplitude modulation (QAM) symbols, denoted $q_1, q_2, \ldots q_K$, selectively and simultaneously to the K single-antenna terminals 104 through a linear precoder 114 that is the pseudo-inverse of the estimate of the forward channel matrix.

Figure 5:
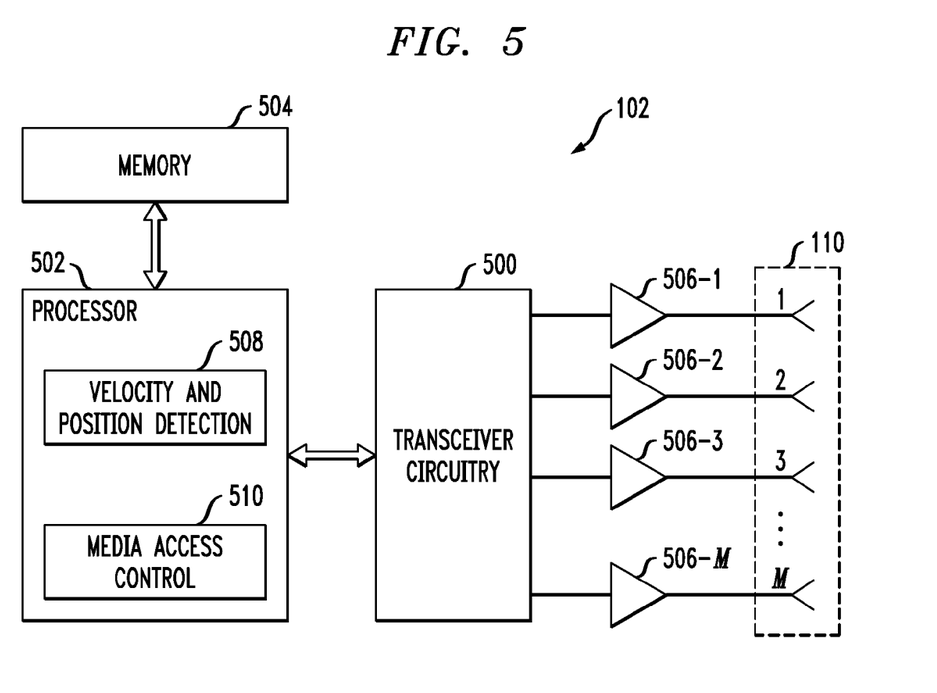
FIG. 5 is a more detailed block diagram of the base station of the multi-user MIMO communication system of FIGS. 1 and 2.

The base station 102 is shown in simplified form in FIGS. 1 and 2 for clarity of illustration, and it is to be understood that in practice a typical base station will include additional elements such as transceiver circuitry, processing circuitry, etc. A more detailed example of one possible base station configuration is shown in FIG. 5. Also, a given MIMO system may include multiple base stations, and a number of different arrangements of terminals of various types.

Figure 3:
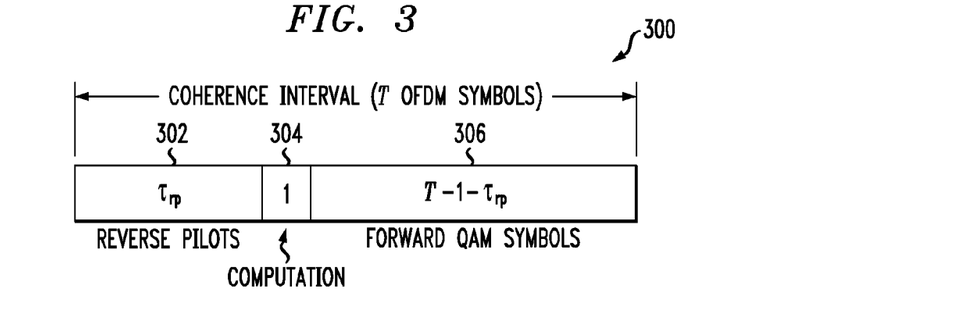
FIG. 3 shows an example of a type of variable slot structure utilized in the multi-user MIMO communication system of FIGS. 1 and 2.

Referring now to FIG. 3, an example of a variable slot structure of the multi-user MIMO system 100 is shown. The variable slot structure in this example comprises a coherence interval 300 of T orthogonal frequency division multiplexed (OFDM) symbols. The coherence interval is a period of time for which it may be assumed that the channel propagation characteristics remain substantially constant, and is an example of what is more generally referred to herein as a slot. As noted above, TDD operation is assumed in system 100, so the base station 102 derives its channel estimate from $\tau_{rp}$ reverse pilot symbols which the terminals 104 transmit on the reverse link. The coherence interval 300 of T symbols in this particular example is shown as being separated into three portions as follows: $\tau_{rp}$ reverse pilot symbols 302, one symbol 304 for computations, and $(T-1-\tau_{rp})$ forward QAM symbols 306, one for each of the terminals 104 that are to be served in the coherence interval.

The slot structure of FIG. 3 is referred to as a variable slot structure because the particular slot length T; the number of terminals to serve in each slot and the number of reverse link pilot symbols per slot are variables that can vary from slot to slot, as will now be described with reference to the flow diagram of FIG. 4. As indicated previously, other types of variable slot structures may be used in other embodiments.

Figure 4:
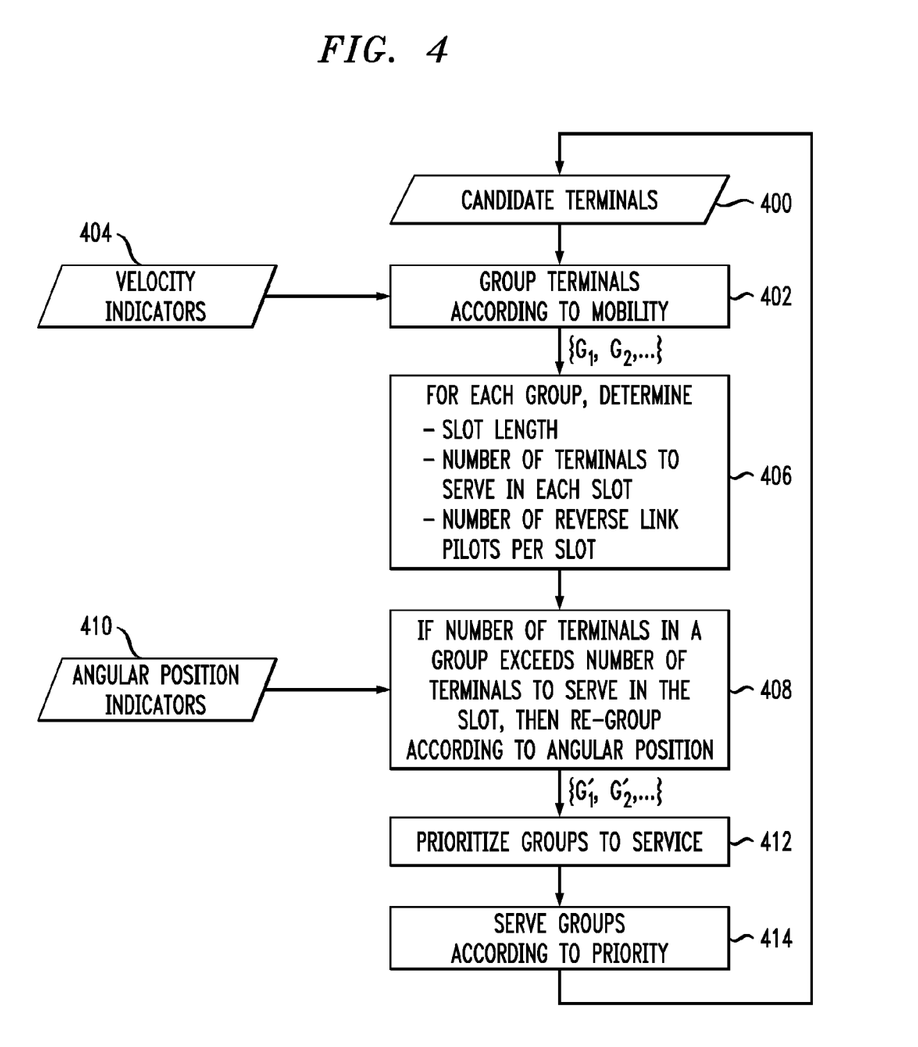
FIG. 4 is a flow diagram of a media access control (MAC) process implemented using the variable slot structure of FIG. 3 in the base station of the multi-user MIMO communication system of FIGS. 1 and 2.

FIG. 4 shows a MAC process implemented using the variable slot structure of FIG. 3 in the base station 102 of system 100. As will be seen, the MAC process is operative to group terminals together for simultaneous service according to their respective mobilities, using velocity indicators obtained for respective ones of the terminals. The MAC process generally determines, for each group of terminals, an appropriate slot structure in terms of slot length, number of terminals to serve and number of reverse link pilot symbols. A given terminal is served in this embodiment by receiving one or more forward link QAM symbols from the base station 102. The set of K terminals 104 as shown in FIGS. 1 and 2 may be viewed as an example of one possible group of terminals as determined by the MAC process of FIG. 4.

The MAC process begins in step 400 with an identified set of candidate terminals. The candidate terminals are those terminals that are candidates for service in the current slot. These candidates can be identified using any of a number of well-known conventional techniques, such as, for example, techniques typically applied in MAC layers of conventional communication systems.

In step 402, the candidate terminals are grouped according to terminal mobility, using velocity indicators 404. The resulting set of groups is denoted $\{G_1, G_2, \ldots\}$, and the particular number of groups in the set is a variable that may be adjusted. The velocity indicators could be, for example, measurements of how rapidly the channels between the base station and the terminals change, as obtained from received pilot signals or using other channel measurement techniques. As another example, a direct measurement of velocity could be obtained for those terminals that are equipped with global positioning satellite (GPS) capability.

The term "mobility" as used herein is to be construed generally so as to encompass, by way of example, any type of information indicative of the speed at which a given terminal is moving within the system. It is to be appreciated that velocity indicators need not be obtained for all terminals of a given system. For example, other types of mobility determinations may be used for certain terminals, while velocity indicators are used for just a subset of the terminals, or the MAC process may only be applied to certain system terminals.

In step 406, the process determines, for each group, the slot length, the number of terminals to serve in each slot, and the number of reverse link pilot symbols to employ in each slot. Exemplary techniques for making such determinations subject to certain assumptions will be described in greater detail below. The slot length for a given group is preferably no longer than an interval of time over which the terminals of that group move some specified fraction of a wavelength at the communication frequency, for example, one-eighth of a wavelength, although other techniques can be used to define the slot length.

Some of the groups established in step 402 may contain more terminals than can be served in one slot. A given group of this type may be split into two or more smaller groups as indicated in step 408. More particularly, in this embodiment, information concerning the relative angular positions of the terminals is used to determine the splitting of the given group into smaller groups. Generally, the given group is split into smaller groups such that each of the smaller groups contains terminals that are well-separated in angle. The angular position information in this embodiment is in the form of angular position indicators 410 for the respective terminals, and can be obtained using well-known conventional techniques, such as GPS measurements. The group splitting operation of step 408 results in a new set of groups denoted $\{G_1', G_2', \ldots\}$. This set may include one or more groups that are not split into multiple groups in step 408, and any such groups remain the same as those resulting from the initial grouping operation in step 402.

In step 412, the process determines the order in which to serve the groups of terminals by prioritizing the groups. This prioritization for service may be based on well-known conventional MAC techniques involving fairness, demand or other factors. The groups are then served in accordance with their respective priorities as indicated in step 414. Thus, each group of terminals is served in one or more slots that have a structure, in terms of slot length, number of terminals to be served and number of reverse link pilots, that is specifically optimized for that group. In typical practical implementations, it is expected that the duration of the data streams to be transmitted from the base station to the terminals may require the use of two or more slots per group.

The MAC process as shown in FIG. 4 may be implemented at least in part in the form of software which runs on a processor of an otherwise conventional base station.

FIG. 5 shows a more detailed view of one possible configuration of the base station 102 of multi-user MIMO system 100. In this embodiment, the base station 102 comprises transceiver circuitry 500, a processor 502 and a memory 504. The transceiver circuitry 500 is coupled to the M antennas of the antenna array 110 via respective power amplifiers 506-1, 506-2, ... 506-M as shown. One or more software programs for implementing the MAC process of FIG. 4 are stored in memory 504 and executed by processor 502. The processor 502 is shown as including a velocity and position detection element 508 and a media access control element 510, which may represent functional software components executed by the processor. The processor 502 may comprise multiple integrated circuits, digital signal processors or other types of processing devices, and associated supporting circuitry, in any combination. Of course, numerous alternative arrangements of hardware, software or firmware in any combination may be utilized in implementing the base station 102.

The power amplifier arrangement shown in FIG. 5 is associated with forward link transmission in the base station 102. Although not explicitly shown, additional elements associated with reverse link reception will also be present in base station 102, such as, for example, preamplifiers which connect respective ones of the antennas of the array 110 to receiver portions of the transceiver circuitry 500.

It is to be appreciated that the particular system configuration, variable slot structure, operation and other characteristics of the illustrative embodiment of FIGS. 1 through 5 are presented by way of example only. Other embodiments may use different system configurations, slot structures, operations, etc. depending on the needs of the particular communication application.

Detailed examples of the manner in which the slot structure may be determined for particular groups of terminals in step 406 of the FIG. 4 MAC process will now be described with reference to the plots of FIGS. 6 through 17. In these examples, slot structures are determined subject to certain assumptions regarding configuration, slot structure, operation and other characteristics of the multi-user MIMO system 100. It should be emphasized, however, that these and any other assumptions made herein are not requirements of the invention, and need not apply in other embodiments.

As described above, base station 102 in the illustrative embodiment comprises M antennas that communicate with K autonomous single-antenna terminals 104. For purposes of the following examples, it is assumed that the forward link propagation is characterized by a K×M propagation matrix H.

No distinction is made between a flat-fading channel and a frequency-dependent channel. In the latter case H is a function of frequency typically handled by OFDM. Rayleigh fading is assumed such that the elements of H are independent identically distributed (iid) CN(0,1) (i.e., zero-mean, circularly-symmetric complex Gaussian). Again, TDD operation is assumed so that the reverse link propagation matrix is the transpose of the forward propagation matrix via reciprocity as previously described.

On the forward link the signal received by the k-th terminal is $$x_{fk} = \sqrt{\rho_f} \sum_{m=1}^{M} h_{km} s_{fm} + w_{fk}, k = 1, \ldots, K. \quad (1)$$

The components of the additive noise are iid, CN(0,1), and there is an average power constraint $$E\left\{\sum_{m=1}^{M} |s_{fm}|^2\right\} = 1, \quad (2)$$

so that the total forward transmitted power is independent of the number of base station antennas. The constant $\rho_f$ is the forward SINR at each terminal.

On the reverse link the signal received by the m-th base station antenna is $$x_{rm} = \sqrt{\rho_r} \sum_{k=1}^{K} h_{km} s_{rk} + w_{rm}, \quad (3)$$

$$m = 1, \ldots, M.$$

Again the components of the additive noise are iid, CN(0,1). The power constraint is $$E\{|s_{rk}|^2\} = 1, k = 1, \ldots, K, \quad (4)$$

which differs from the forward power constraint: note that the total reverse link power increases with the number of terminals. The constant $\rho_r$ is the SINR which each terminal by itself is capable of producing at each base station antenna.

Typical base station powers are ten watts, while typical terminal powers are one-hundred milliwatts, although other power levels may be used. In a thermal noise-limited environment, the reverse SINR would be twenty dB smaller than the forward SINR. For purposes of the present examples, an interference-limited environment is assumed and it is further assumed that the reverse SINR is ten dB smaller than the forward SINR.

The terminals 104 transmit, on the reverse link, a sequence of known pilot signals of duration $\tau_{rp} \geq K$ symbols in the manner shown in FIG. 1. The K×$\tau_{rp}$ pilot signal is $\sqrt{\tau_{rp}} \Psi^H$ where $\Psi$ is a $\tau_{rp}$×K unitary matrix, $\Psi^H\Psi = I_K$, and the superscript "H" denotes "conjugate-transpose." The use of orthogonal spreading sequences permits the terminals to transmit simultaneously at their full powers of one without interfering with each other. The received M×$\tau_{rp}$ pilot signal is $$Y_r = \sqrt{\rho_r \tau_{rp}} H^T \cdot \psi^H + V_r, \quad (5)$$

where $V_r$ is the additive noise, which, after de-spreading, yields the minimum-mean-square linear estimator for the channel matrix, $$\hat{H} = \frac{\sqrt{\rho_r \tau_{rp}}}{1 + \rho_r \tau_{rp}} \cdot \Psi^T \cdot Y_r^T. \quad (6)$$

The estimate, $\hat{H}$, is independent of the estimation error, $\tilde{H} = \hat{H} - H$. The components of H are iid, $$CN\left(0, \frac{\rho_r \tau_{rp}}{1 + \rho_r \tau_{rp}}\right),$$

and the components of $\tilde{H}$ are iid, $$CN\left(0, \frac{1}{1 + \rho_r \tau_{rp}}\right).$$

Note that the minimum required number of pilot symbols is equal to the number of terminals, and is independent of the number of base station antennas. Likewise the mean-square estimation error is independent of the number of base station antennas.

The base station transmits QAM symbols on the forward link selectively and simultaneously to the terminals through a M×K pre-conditioning matrix, A, that is proportional to the pseudo-inverse of the estimate for the forward channel, $$A = \frac{\hat{H}^H(\hat{H}\hat{H}^H)^{-1}}{\sqrt{tr[(\hat{H}\hat{H}^H)^{-1}]}}. \quad (7)$$

The pre-conditioning ostensibly diagonalizes the forward channel. The normalization is chosen so that $tr(A^H A) = 1$.

As shown in FIG. 2, during each forward transmission symbol the base station multiplies a K×1 vector of QAM symbols by the pre-conditioning matrix to produce an M×1 signal vector which drives the antennas, $\bar{s}_f = A \cdot \bar{q}$, where the QAM symbols are independent, each with expected power of one, $E\{|q_k|^2\} = 1, k = 1, \ldots, K$. The signals that are received by the terminals, expressed as a vector, are $$\bar{x}_f = \sqrt{\rho_f} H \cdot A \cdot \bar{q} + \bar{w}_f. \quad (8)$$

From the standpoint of the reverse link pilot, extra base station antennas are cost-free. It will be demonstrated heuristically, in the asymptotic region where M/K>>1, that there is a positive benefit in having extra base station antennas. Note that the elements of $\hat{H}$ are iid and proportional to CN(0,1) random variables. Therefore $$\lim_{M/K \to \infty} \hat{H} \hat{H}^H \propto I_K,$$

so the pre-conditioning matrix (7) is proportional to the conjugate-transpose of the channel estimate. Note in (8) that the effective forward channel is a K×K matrix that is equal to the product of the actual propagation matrix and the pre-conditioning matrix, $$G = H \cdot A. \quad (9)$$

In the asymptotic regime, M/K≫1, so $$G = H \cdot A \propto H \cdot \left(\sqrt{\rho_r \tau_{rp}} H + \Psi^T V_r^T\right)^H$$
$$= \sqrt{\rho_r \tau_{rp}} H \cdot H^H + H \cdot V_r^* \Psi^*.$$

Also, $H \cdot H^H \rightarrow M \cdot I_K$, while the elements of $H \cdot V_r^* \Psi^*$ are uncorrelated with standard deviation equal to $\sqrt{M}$. Hence $$G \underset{M/K \gg 1}{\propto} \left(M\sqrt{\rho_r \tau_{rp}} \cdot I_K + \sqrt{M} \cdot Z\right)$$

where the elements of Z are zero-mean, and uncorrelated with unit-variance. Consequently the channel information can be arbitrarily bad, but the use of more and more antennas in the base station will produce a better and better approximation to the ideal diagonal effective channel. In addition, the effective gain increases and more terminals can be served.

The channel characterized by (8) has a lower throughput than does the ideal multi-user MIMO channel. There are three sources of impairment: the pre-conditioning matrix is computed from an imperfect channel estimate, the use of a pseudo-inverse is suboptimal, and the terminals do not precisely know the effective channel (9). A rigorous lower bound on the sum-capacity of the multi-user MIMO system will now be derived. The sum-capacity is a measure of the throughput of the system. The derivation of the lower bound on the sum-capacity follows an approach described in B. Hassibi and B. M. Hochwald, "How much training is needed in multiple-antenna wireless links?," IEEE Trans. Information Theory, vol. 49, no. 4, April 2003, which is incorporated by reference herein.

Although the terminals do not know the effective channel, they do know its mean. One can substitute (9) into (8), and add and subtract the mean of the effective channel as follows, $$\bar{x}_f = \sqrt{\rho_f} E\{G\} \cdot \bar{q} + \left(\bar{w}_f + \sqrt{\rho_f}(G - E\{G\}) \cdot \bar{q}\right) \quad (10)$$
$$= \sqrt{\rho_f} E\{G\} \cdot \bar{q} + \bar{w}_{\mathit{eff}},$$

where $\bar{w}_{\mathit{eff}}$ is the effective noise (unknown to the terminals). The statistics of the effective gain can then be computed. From the foregoing, $$G = H \cdot A = \hat{H} \cdot A - \tilde{H} \cdot A \quad (11)$$
$$= \frac{I_K}{\sqrt{tr[(\hat{H}\hat{H}^H)^{-1}]}} - \tilde{H} \cdot A,$$

where $\tilde{H} = \hat{H} - H$, and having substituted the expression for the precoding matrix (7). Recall that $\hat{H}$ is independent of $\tilde{H}$, so $\tilde{H}$ is independent of A. Also, the effective noise $\bar{w}_{\mathit{eff}}$ is uncorrelated with (but not independent of) the QAM symbols $\bar{q}$. Define a random scalar, $\phi$, as follows $$\phi(tr[(ZZ^H)^{-1}])^{-1/2}, \quad (12)$$

where Z is a K×M random matrix whose elements are iid CN(0,1). Let $\bar{g}_k$ be the k-th row vector of G. It can be shown that $$E\{\bar{g}_k\} = \sqrt{\frac{\rho_r \tau_{rp}}{1 + \rho_r \tau_{rp}}} \cdot E\{\phi\} \cdot \bar{e}_k^T, \quad (13)$$

$$\text{cov}\{\bar{g}_k\} = \frac{I_K}{K(1 + \rho_r \tau_{rp})} + \frac{\rho_r \tau_{rp}}{1 + \rho_r \tau_{rp}} \cdot \text{var}\{\phi\} \cdot \bar{e}_k \bar{e}_k^T, \quad (14)$$

where $\bar{e}_k$ is the K×1 vector whose k-th element is equal to one, and all other elements are equal to zero.

It can be shown that the k-th terminal receives the following signal $$x_{f_k} = \sqrt{\frac{\rho_f \rho_r \tau_{rp}}{1 + \rho_r \tau_{rp}}} \cdot E\{\phi\} \cdot q_k + w_{\mathit{eff}k}, \quad (15)$$
$$k = 1, \ldots, K,$$

where the effective noise, uncorrelated with the QAM signal, is zero-mean with variance $$\text{var}\{w_{\mathit{eff}k}\} = 1 + \rho_f \left[\frac{1}{1 + \rho_r \tau_{rp}} + \frac{\rho_r \tau_{rp}}{1 + \rho_r \tau_{rp}} \cdot \text{var}\{\phi\}\right]. \quad (16)$$

Using the approach of the above-cited B. Hassibi et al. reference, the lower bound of the sum-capacity can be determined as follows. First, the QAM symbols are made CN(0,1) which provides a lower bound. Further, the mutual information is lower bounded by assuming that the effective noise is complex Gaussian. The end result is the following lower bound on sum-capacity, $$C_{sum} \geq K \cdot \log_2 \left\{ 1 + \frac{\rho_r \left(\frac{\rho_r \tau_{rp}}{1 + \rho_r \tau_{rp}}\right) E^2\{\phi\}}{1 + \rho_f \left[\frac{1}{1 + \rho_r \tau_{rp}} + \frac{\rho_r \tau_{rp}}{1 + \rho_r \tau_{rp}} \cdot \text{var}\{\phi\}\right]} \right\}, \quad (17)$$

where $\phi$ is defined by (12). When the number of base station antennas grows large compared with the number of terminals, suitable approximations for the mean and variance of $\phi$ can be substituted to obtain $$C_{sum} \underset{M \gg K}{\gtrsim} K \cdot \log_2 \left\{ 1 + \frac{\rho_r \left(\frac{\rho_r \tau_{rp}}{1 + \rho_r \tau_{rp}}\right) \cdot \frac{M}{K}}{1 + \rho_f \left[\frac{1}{1 + \rho_r \tau_{rp}} + \frac{\rho_r \tau_{rp}}{1 + \rho_r \tau_{rp}} \cdot \frac{1}{4K^2}\right]} \right\}. \quad (18)$$

For a fixed ratio of the number of base station antennas to the number of terminals, the sum-capacity increases linearly with the number of terminals.

Figure 6:
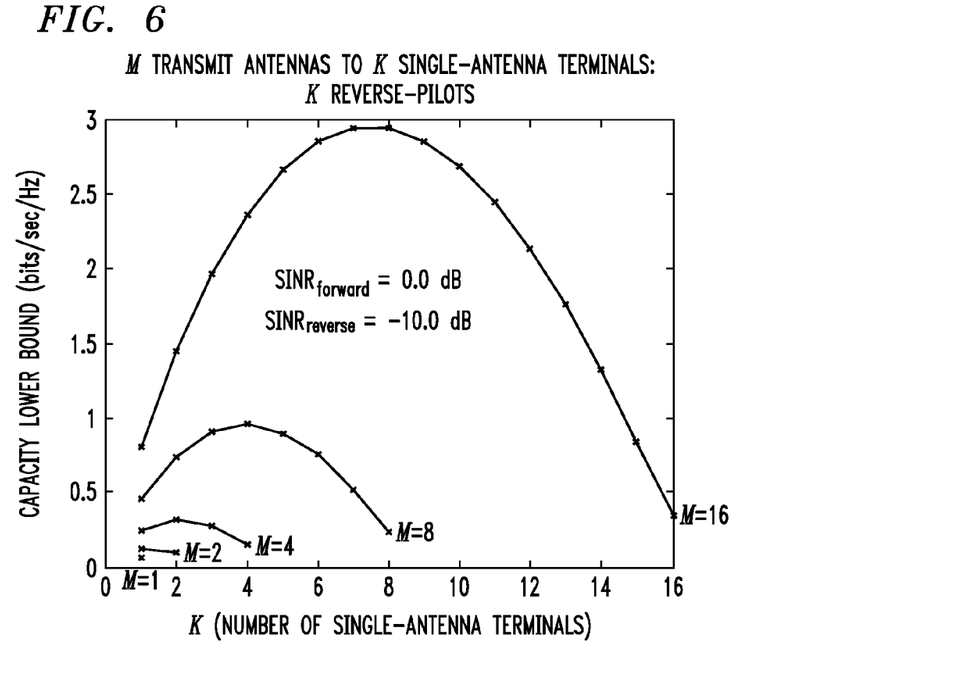
FIGS. 6, 7 and 8 are plots of a lower bound on sum-capacity as a function of number of terminals served in exemplary multi-user MIMO systems.
Figure 7:
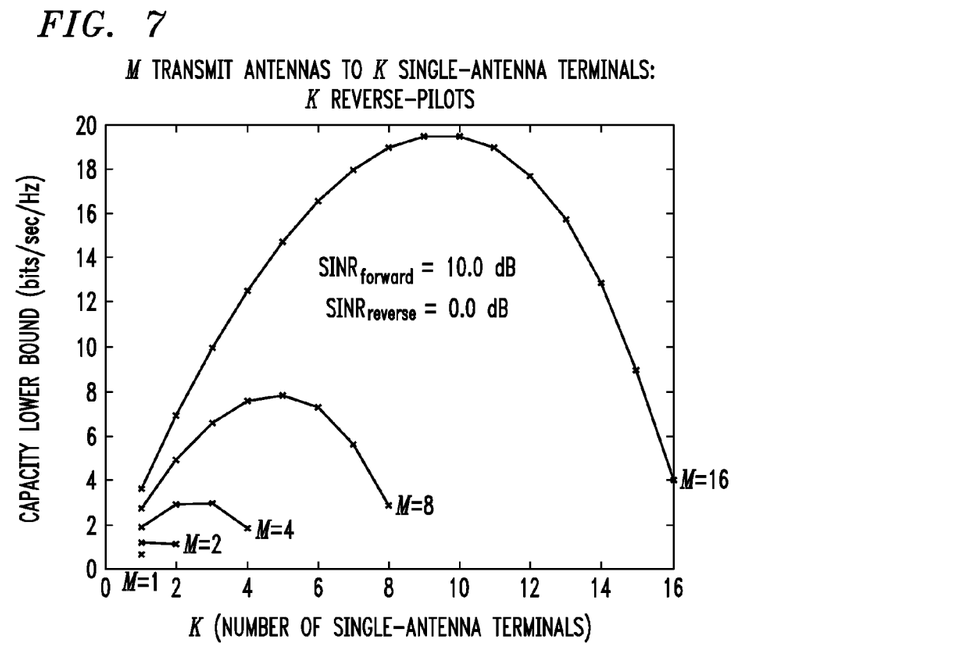
Figure 8:
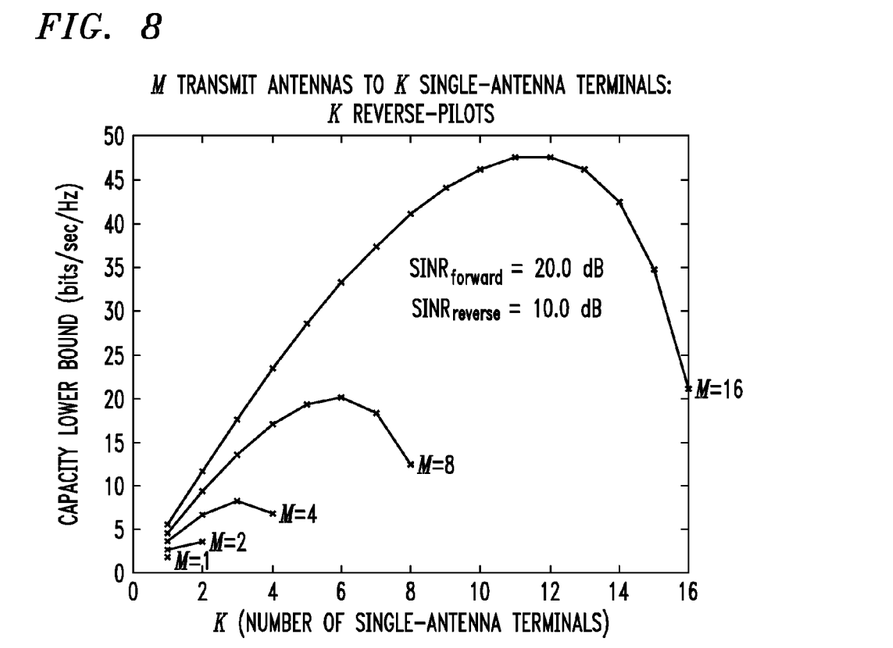

FIGS. 6, 7 and 8 are plots of the sum-capacity lower bound (17) (bits/sec/Hz) versus the number of terminals served, K, for M=1, 2, 4, 8, 16 base station antennas. The forward SINR is $\rho_f$={0.0, 10.0, 20.0}1 dB for FIGS. 6, 7 and 8, respectively, and the reverse SINR is ten dB less, $\rho_r$={−10.0, 0.0, 10.0}dB. In all cases the minimum possible number of reverse pilot symbols is used, i.e., $\tau_{rp}$=K.

A number of observations can be made from the plots of FIGS. 6, 7 and 8. First, the sum-capacity increases monotonically with the number of base station antennas. Second, it is generally advantageous for the base station to serve more than one terminal, even at low SINRs. Third, for a given number of base station antennas there is, from the standpoint of instantaneous throughput, an optimum number of terminals to serve. For short coherence intervals, however, there may not be sufficient time to send the required number of reverse pilots. This effect will be quantified in the following description.

As previously noted in conjunction with FIG. 3, it may be assumed that the channel stays constant for a coherence interval of T symbols. Typically a symbol occupies approximately fifty microseconds. FIG. 3 shows that during the coherence interval 300 over which the channel is assumed to be constant, the terminals have to transmit $\tau_{rp}$ reverse pilots, the base station has to compute the channel estimate and the pre-conditioning matrix, and the base station has to transmit QAM symbols to the terminals. The illustrative embodiment of FIG. 3 assumes that the computation of the channel estimate and the pre-conditioning matrix occupy one symbol, as shown in the figure.

Given a number of base station antennas, M, and given values for the forward and reverse SINRs, $\rho_f$ and $\rho_r$, one can simultaneously choose the number of terminals to serve, and the number of reverse link pilots, to maximize the net throughput, $$C_{net} = \max_{K,\tau_{rp}} \left( \frac{T - 1 - \tau_{rp}}{T} \right) \cdot C_{sum}(K, \tau_{rp}), \quad (19)$$

subject to: $K \leq M, \tau_{rp} \geq K$ where $C_{sum}(\cdot)$ is given by (17).

Figure 9:
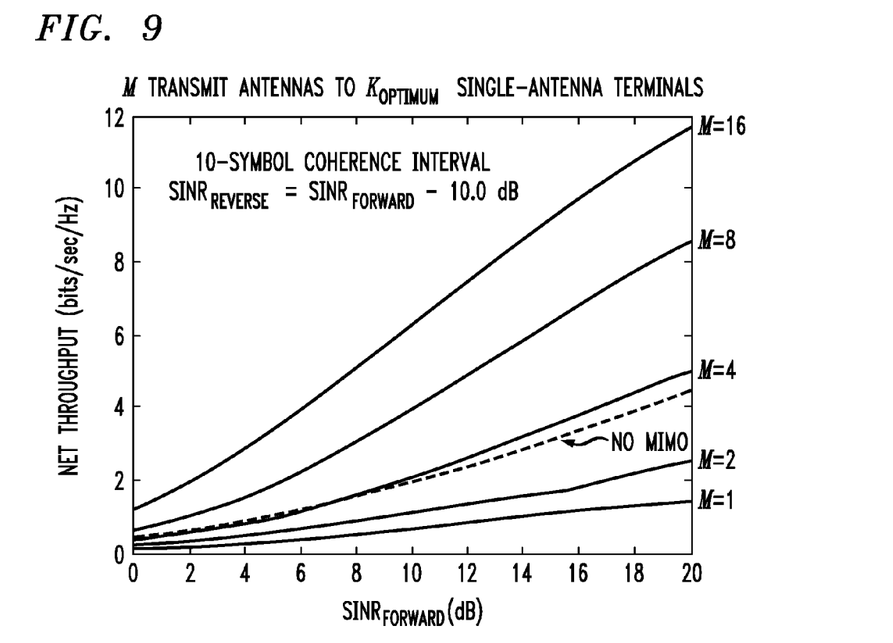
FIGS. 9, 10 and 11 are plots of net throughput as a function of forward signal to interference-plus-noise ratio (SINR) in exemplary multi-user MIMO systems.
Figure 10:
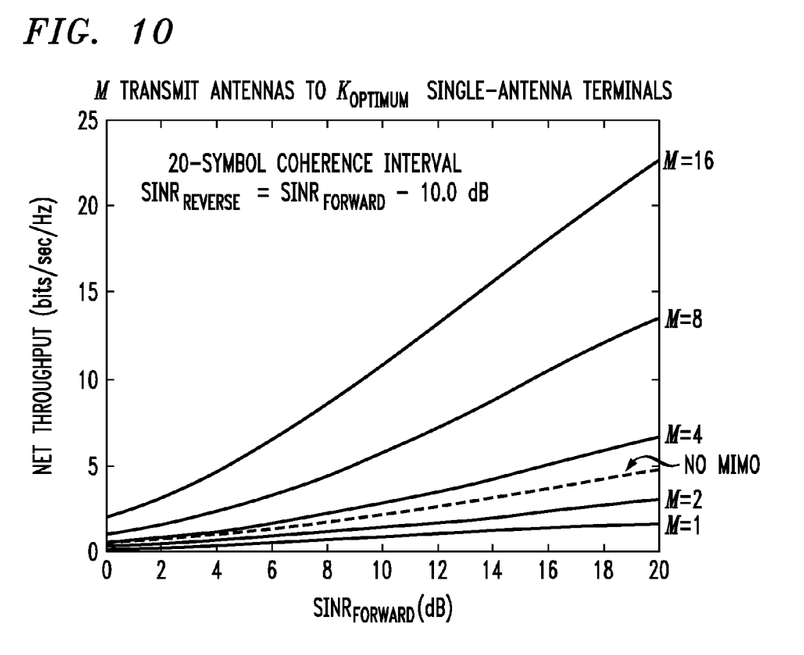
Figure 11:
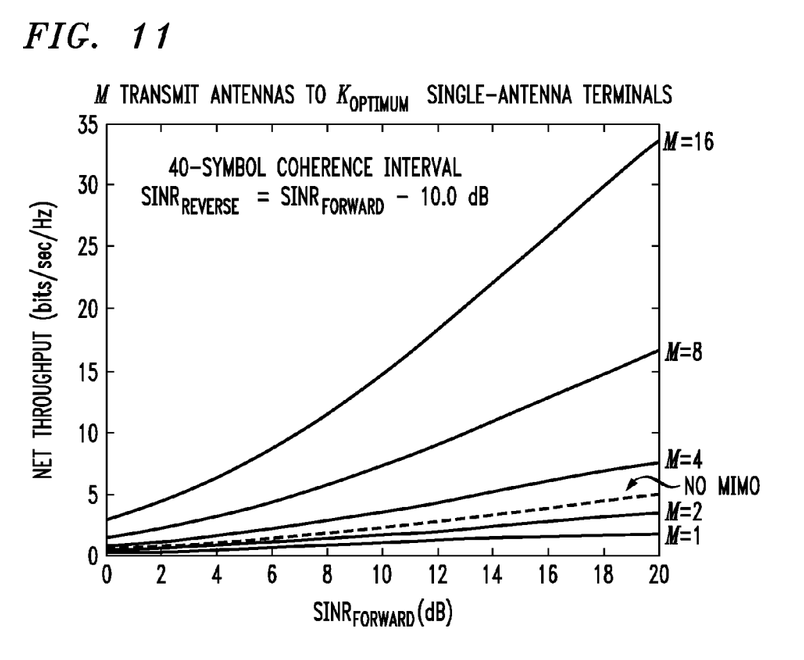
Figure 12:
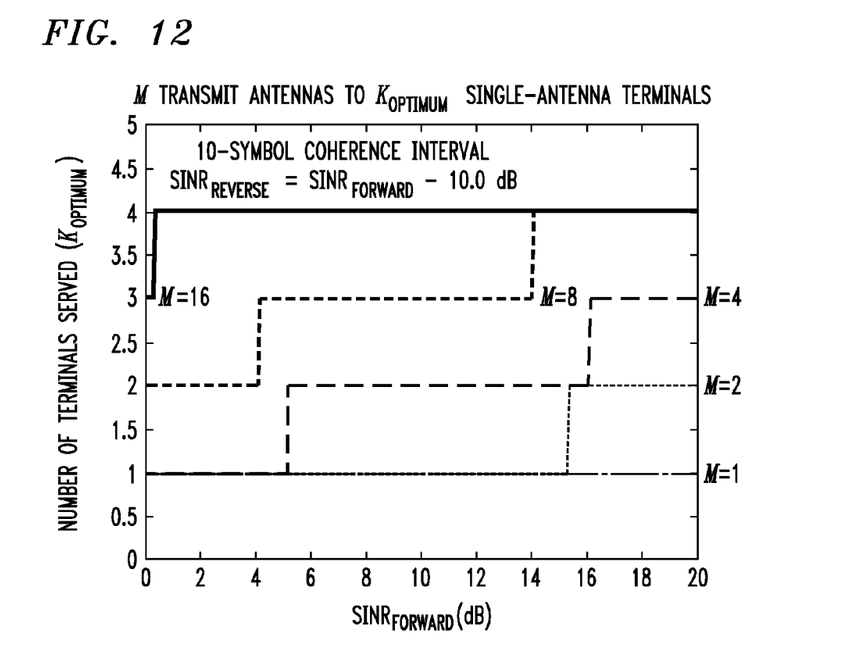
FIGS. 12, 13 and 14 are plots of optimum number of terminals to serve as a function of forward SINR in exemplary multi-user MIMO systems.
Figure 13:
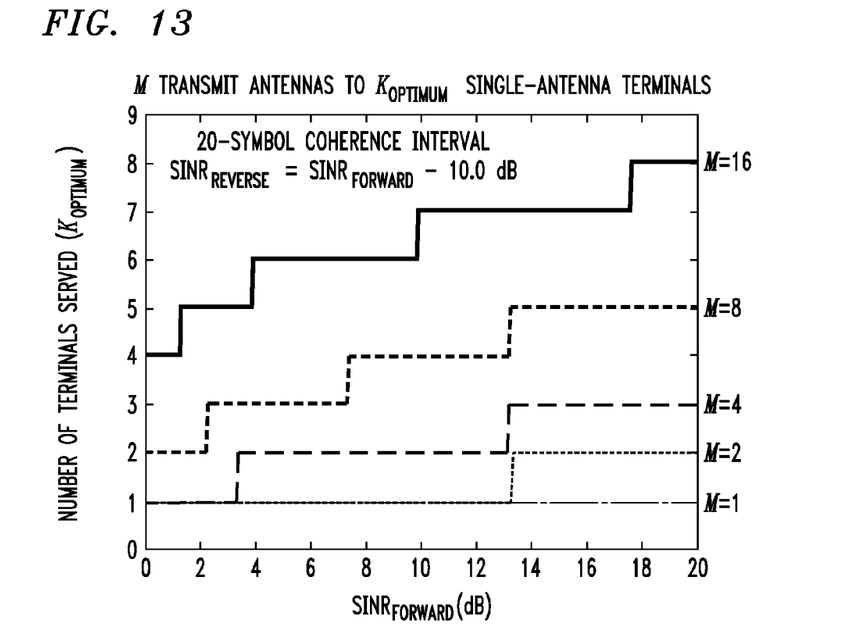
Figure 14:
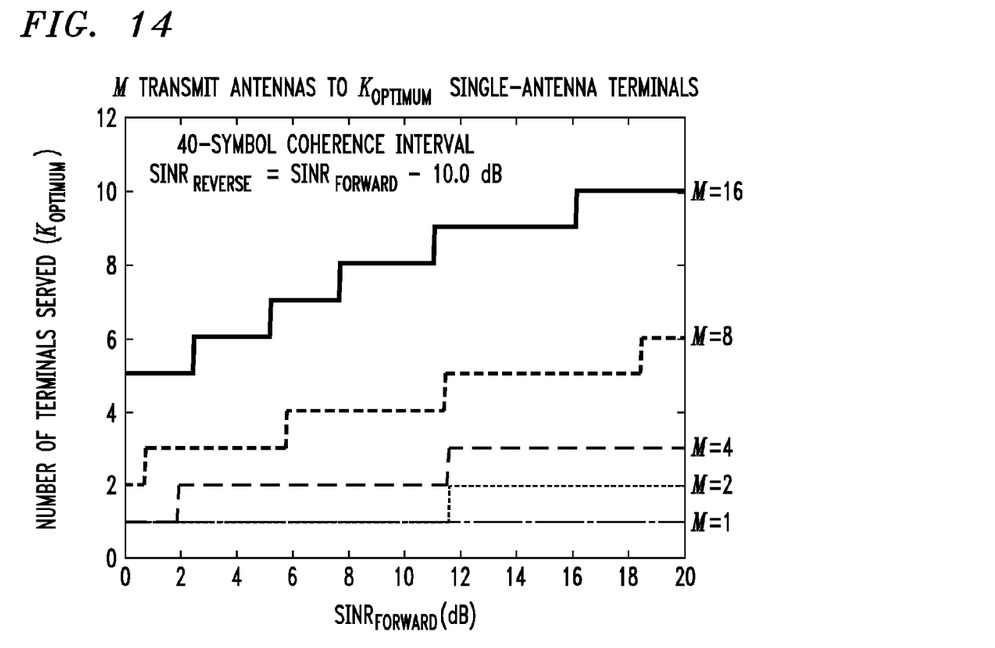

FIGS. 9, 10 and 11 show the net throughput (bits/sec/Hz) as a function of the forward SINR, for M=1, 2, 4, 8, 16 base station antennas. The dashed curve (labeled "no MIMO") corresponds to a base station having one antenna and transmitting one data stream to one single-antenna terminal in conjunction with an optimized forward pilot. The duration of the coherence interval is T=10, 20, 40 for FIGS. 9, 10 and 11, respectively. The reverse SINR is everywhere ten dB smaller than the forward SINR. Note that large numbers of base station antennas (M=8, 16) confer substantial gains in throughput compared with the "no MIMO" case. The "no MIMO" case performs significantly better than multi-user MIMO with one base station antenna, in part because the forward pilot is ten dB stronger than the reverse pilot. Also note that the net throughput increases significantly as the duration of the coherence interval increases. The reason for this can be seen in FIGS. 12, 13 and 14 which correspond to the scenarios of FIGS. 9, 10 and 11, respectively, and which display the optimum number of terminals to serve. In the shorter coherence intervals fewer terminals can be served (recall that in this embodiment there is at least one reverse pilot symbol for each terminal), but even then it is generally advantageous for the base station to serve multiple terminals.

Figure 15:
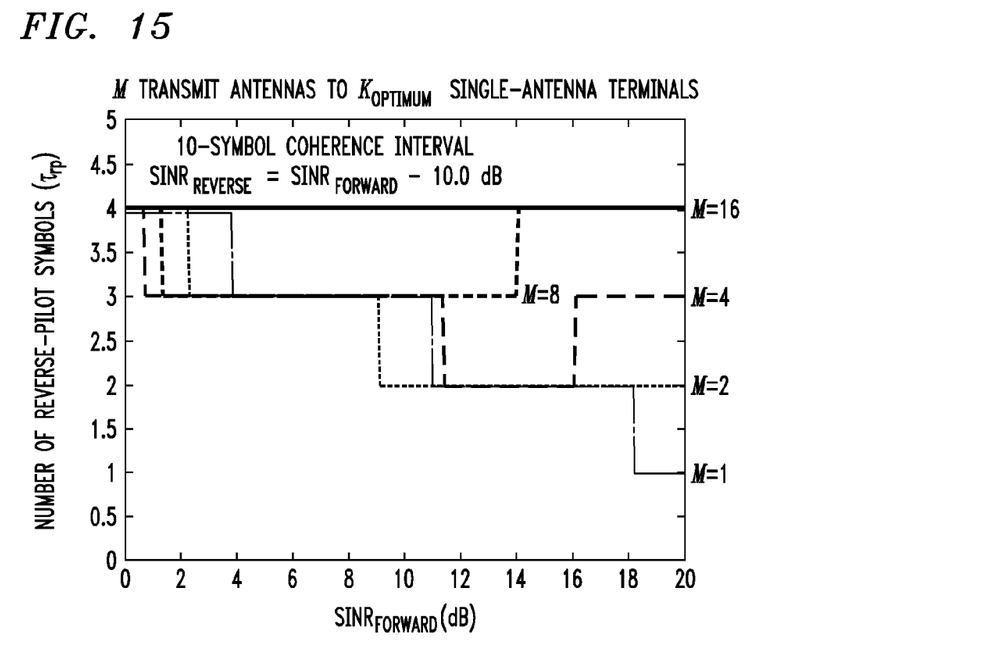
FIGS. 15, 16 and 17 are plots of optimum number of reverse pilot symbols as a function of forward SINR in exemplary multi-user MIMO systems.
Figure 16:
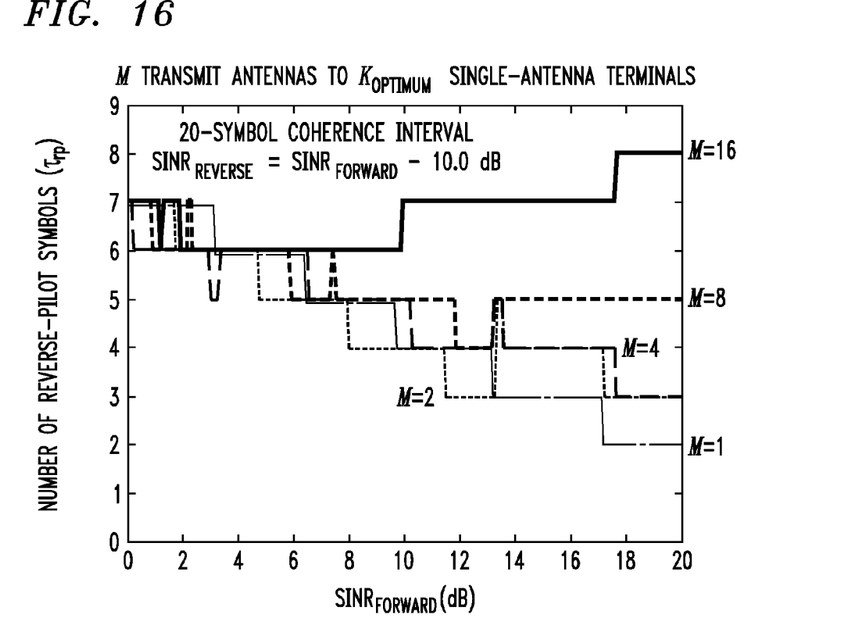
Figure 17:
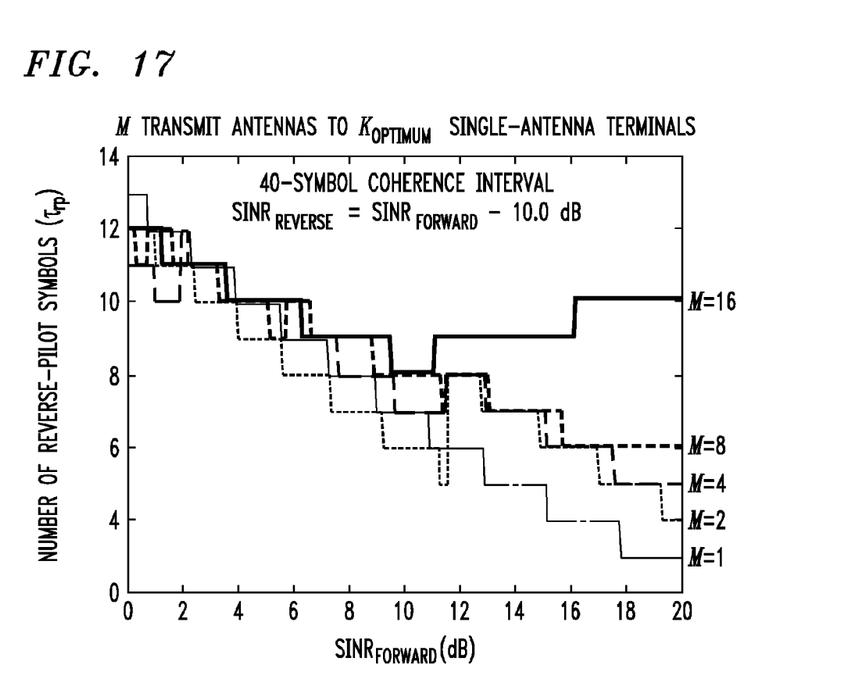

Again for the same scenarios, FIGS. 15, 16 and 17 display the optimum number of reverse pilot symbols to employ. Within the shorter coherence intervals the use of a large number of base station antennas typically implies that approximately half of the coherence interval is spent on reverse pilots. In this particular example, the instantaneous throughput is approximately proportional to the number of terminals, as is the required number of pilot symbols. Irrespective of the proportionality constants the maximum net throughput is obtained by spending half of the coherence interval on reverse pilots. Also in this example, and at high SINRs as well, there is approximately one reverse pilot symbol per terminal. It is apparent that overtraining through the use of an excessive number of reverse pilots does not improve throughput.

The examples described above in the context of the plots of FIGS. 6 through 17 indicate that the use of a variable slot structure can provide significantly improved throughput in a multi-user MIMO communication system compared to a system utilizing a fixed slot structure. More specifically, even in short coherence intervals (e.g., T=10 symbols or 500 microseconds) and with low SINRs (e.g., –10 dB reverse, and zero dB forward), a base station comprising sixteen or more antennas can both learn the channel and transmit, with high aggregate throughput, simultaneous multiple data streams to multiple single-antenna terminals.

It should be noted that, in the foregoing examples, it is generally always advantageous to increase the number of base station antennas. This activity does not increase the required number of reverse link pilots. The matrix-valued channel estimate increases in dimensionality, and, although the estimates for the individual channel coefficients do not improve, the effectiveness of the pseudo-inverse of the forward channel does improve.

As previously noted, the configuration of the multi-user MIMO system 100 may vary to suit the needs of a particular application. The foregoing examples indicate that one possible configuration for a high-throughput application is one in which the base station 102 has sixteen or more antennas, each driven by its own power amplifier as shown in FIG. 5, although other numbers of antennas could be used. For example, a base station having about fifty to one hundred antennas may be used, again with each such antenna being driven by its own power amplifier as shown in FIG. 5.

Although illustrated in the context of a particular type of multi-user MIMO system, the disclosed techniques are also applicable to other types of MIMO systems. For example, it was noted above that another type of multi-user MIMO system, sometimes referred to as multi-access MIMO, involves autonomous single-antenna terminals sending multiple data streams simultaneously to a multi-antenna array in the base station. In such a system, reverse link pilots may be used to inform the base station of the propagation characteristics of the reverse channel, and the base station can process its received data streams by computing and applying the pseudo-inverse of the channel matrix to the signals that it receives from its antennas. One possible combination of broadcast and multi-access MIMO would utilize alternate broadcast and multi-access slots. Such slots can be configured to have a variable structure using the techniques disclosed herein.

Again, it is to be appreciated that the particular assumptions, configurations and other characteristics of the illustrative embodiments described above are presented by way of example only. Accordingly, the particular MIMO system configuration shown in FIGS. 1 and 2 and the variable slot structure shown in FIG. 3 may be altered in other embodiments. Also, the techniques for grouping terminals according to mobility, prioritizing groups for service, etc. in the MAC process of FIG. 4 may be altered to accommodate particular applications. These and numerous other alternative embodiments within the scope of the appended claims will be readily apparent to those skilled in the art.

What is claimed is:

1. A method of communicating information in a multiple-input, multiple-output communication system in which a base station communicates with multiple terminals, the method comprising the steps of:
   determining mobilities for respective ones of the terminals;
   assigning the terminals into groups based on the determined mobilities;
   utilizing at least first and second different slot structures for communicating with the terminals of at least respective first and second ones of the groups; and
   utilizing a plurality of antennas of an antenna array to simultaneously communicate with respective ones of the terminals within a given slot configured in accordance with one of the first and second slot structures;
   wherein the first and second slot structures define respective intervals each configured for communicating a plurality of pilot symbols to the base station and a plurality of communication symbols from the base station;
   wherein the first slot structure has a first length in number of symbols, the first length being determined based on a first coherence interval associated with the first group of terminals;
   wherein the second slot structure has a second length in number of symbols, the second length being determined based on a second coherence interval associated with the second group of terminals; and
   wherein the first length is different than the second length.

2. The method of claim 1 wherein the antenna array comprises M antennas and the multiple terminals comprise K single-antenna terminals, where $M \geq K$.

3. The method of claim 2 wherein the number of pilot symbols in each of the first and second slot structures is greater than or equal to K.

4. The method of claim 2 wherein each of the communication symbols in a given one of the first and second slot structures is utilized for communication with a different one of the K single-antenna terminals.

5. The method of claim 1 further comprising the step of determining an optimal slot structure for communicating with the terminals of a given one of the groups.

6. The method of claim 5 further comprising the step of determining optimal slot structures for communicating with the terminals of respective ones of the groups.

7. The method of claim 5 wherein the step of determining an optimal slot structure for communicating with the terminals of a given one of the groups further comprises the step of simultaneously determining a number of terminals to serve in a slot and a number of reverse link pilots for the slot by maximizing a throughput measure given a specified number of base station antennas.

8. The method of claim 7 wherein the throughput measure comprises a lower bound on a sum-capacity of the system.

9. The method of claim 1 wherein a given one of the slot structures is specified by a slot length, a number of terminals to be served in the slot over a forward link and a number of reverse link pilots.

10. The method of claim 1 wherein the first and second coherence intervals have respective durations specified as particular numbers of communication symbols within the system.

11. The method of claim 10 wherein each of the first and second coherence intervals includes a first portion comprising a plurality of reverse pilots, a second portion comprising a training computation interval, and a third portion comprising a plurality of forward link symbols.

12. The method of claim 11 wherein a given one of the first and second coherence intervals has a duration of T symbols, the first portion of the given coherence interval comprises $\tau_{rp}$ reverse pilot symbols transmitted by the terminals of the corresponding group to the base station, the second portion of the given coherence interval comprises a training computation interval with a duration of a single symbol, and the third portion of the given coherence interval comprises $(T-1-\tau_{rp})$ forward symbols which are transmitted by the base station to respective ones of the terminals of the corresponding group.

13. The method of claim 1 wherein the step of determining mobilities for respective ones of the terminals further comprises obtaining velocity indicators for respective ones of the terminals.

14. The method of claim 1 wherein the mobilities for respective ones of the terminals are determined at least in part based on channel measurements.

15. The method of claim 1 wherein the mobilities for respective ones of the terminals are determined at least in part based on GPS measurements.

16. The method of claim 1 wherein if a given one of the groups includes more terminals than can be served in a single slot, the given group is separated into two or more smaller groups based on relative angular positions of the terminals in the given group.

17. The method of claim 1 further including the steps of:
   establishing a priority for serving the groups; and
   serving the groups in accordance with the established priority.

18. An article of manufacture comprising a non-transitory processor-readable storage medium storing one or more software programs which when executed by a processor perform the steps of the method of claim 1.

19. An apparatus comprising a base station of a multiple-input, multiple-output communication system, the base station being configured to communicate with multiple terminals of the system, wherein the base station is operative to:
   determine mobilities for respective ones of the terminals;
   assign the terminals into groups based on the determined mobilities;
   utilize at least first and second different slot structures for communicating with the terminals of at least respective first and second ones of the groups; and
   utilize a plurality of antennas of an antenna array to simultaneously communicate with respective ones of the terminals within a given slot configured in accordance with one of the first and second slot structures;
   wherein the first and second slot structures define respective intervals each configured for communicating a plurality of pilot symbols to the base station and a plurality of communication symbols from the base station;
   wherein the first slot structure has a first length in number of symbols, the first length being determined based on a first coherence interval associated with the first group of terminals;
   wherein the second slot structure has a second length in number of symbols, the second length being determined based on a second coherence interval associated with the second group of terminals; and
   wherein the first length is different than the second length.

20. The apparatus of claim 19 wherein the base station comprises:
   the antenna array comprising the plurality of antennas for communicating with the multiple terminals;

transceiver circuitry coupled to the antennas of the antenna array; and a processor coupled to the transceiver circuitry;

wherein said processor is configured to perform the determine, arrange and utilize operations.

21. A multiple-input, multiple-output communication system comprising:

a plurality of terminals; and at least one base station configured to communicate with the terminals;

wherein the base station is operative to:

determine mobilities for respective ones of the terminals;

assign the terminals into groups based on the determined mobilities;

utilize at least first and second different slot structures for communicating with the terminals of at least respective first and second ones of the groups; and utilize a plurality of antennas of an antenna array to simultaneously communicate with respective ones of the terminals within a given slot configured in accordance with one of the first and second slot structures;

wherein the first and second slot structures define respective intervals each configured for communicating a plurality of pilot symbols to the base station and a plurality of communication symbols from the base station; and wherein the first slot structure has a first length in number of symbols, the first length being determined based on a first coherence interval associated with the first group of terminals;

wherein the second slot structure has a second length in number of symbols, the second length being determined based on a second coherence interval associated with the second group of terminals; and wherein the first length is different than the second length.

* * * * *